US012349682B2

(12) United States Patent
Axtell

(10) Patent No.: US 12,349,682 B2
(45) Date of Patent: Jul. 8, 2025

(54) FOOD CUTTING ASSEMBLY

(71) Applicant: John D. Axtell, Summit, NJ (US)

(72) Inventor: John D. Axtell, Summit, NJ (US)

( * ) Notice: Subject to any disclaimer, the term of this patent is extended or adjusted under 35 U.S.C. 154(b) by 318 days.

(21) Appl. No.: 17/945,016

(22) Filed: Sep. 14, 2022

(65) Prior Publication Data
US 2023/0013836 A1   Jan. 19, 2023

Related U.S. Application Data

(63) Continuation-in-part of application No. 17/187,665, filed on Feb. 26, 2021, now abandoned.

(60) Provisional application No. 62/981,886, filed on Feb. 26, 2020.

(51) Int. Cl.
*A21C 15/04* (2006.01)
*A47J 27/00* (2006.01)
*A47J 47/02* (2006.01)

(52) U.S. Cl.
CPC .............. *A21C 15/04* (2013.01); *A47J 27/00* (2013.01); *A47J 47/02* (2013.01); *A47J 2027/006* (2013.01)

(58) Field of Classification Search
CPC ..... B26D 1/553; A47J 47/08; A47J 2027/006; A21C 15/04; A21C 11/106
USPC ............ 30/114, 117, 302, 303, 305; D7/360, D7/354, 409; 99/444–446
See application file for complete search history.

(56) References Cited

U.S. PATENT DOCUMENTS

| 512,080 | A | * | 1/1894 | Winter | B29C 48/0022 425/308 |
| 1,442,762 | A | * | 1/1923 | Du Buque | B26D 1/553 83/647 |
| 1,448,938 | A | * | 3/1923 | Parrott | A01J 23/00 30/115 |
| 1,653,578 | A | * | 12/1927 | Larsen | B26D 1/553 33/525 |
| 1,656,415 | A | * | 1/1928 | Breitkrentz | B26D 3/185 30/303 |
| 1,780,980 | A | * | 11/1930 | Newman | F25C 1/246 D15/90 |

(Continued)

FOREIGN PATENT DOCUMENTS

| CA | 2903806 A1 | * | 3/2016 | ............ B26D 3/185 |
| FR | 335228 A | * | 7/1926 | |

(Continued)

*Primary Examiner* — Laura M Lee
(74) *Attorney, Agent, or Firm* — Gearhart Law LLC

(57) ABSTRACT

The food cutting assembly includes a container with an open top configured to receive a food product, a food cutting device configured to fit closely inside of the container and cut the food product, and a lid configured to engage the opening of the container to cover the container. The lid has a plurality of holes proximate its edge for draining water from the food. The food cutting device includes a peripheral frame structure defining an aperture therein, a plurality of cutting members each having an edge for cutting food, located within the support structure and arranged in a lattice across the aperture to define sections between the cutting members, and one or more handles affixed to the peripheral frame structure. The cutting members are disposed vertically within the aperture, with their edges arranged in a plane proximate the bottom of the food cutting device.

17 Claims, 11 Drawing Sheets

(56) References Cited

U.S. PATENT DOCUMENTS

| | | | | |
|---|---|---|---|---|
| 2,114,277 | A * | 4/1938 | Bloomfield | B26D 1/553 99/452 |
| D158,999 | S * | 6/1950 | Paul | D7/502 |
| 2,710,450 | A * | 6/1955 | Stasinos | A23G 9/28 99/452 |
| 4,984,978 | A * | 1/1991 | Beatty | A21C 3/10 425/332 |
| 5,337,480 | A * | 8/1994 | Codikow | B26D 1/0006 99/545 |
| 5,848,470 | A * | 12/1998 | Anderson | A21C 11/00 30/303 |
| 6,276,918 | B1 * | 8/2001 | Slaughter | A21C 11/106 249/DIG. 1 |
| 7,029,261 | B2 * | 4/2006 | DeYoung | A21C 5/08 425/300 |
| D586,626 | S * | 2/2009 | Carrell | D7/672 |
| D605,478 | S * | 12/2009 | Melton | D7/673 |
| 8,146,468 | B1 * | 4/2012 | Kachelries | B26D 1/553 83/13 |
| 8,857,325 | B2 * | 10/2014 | Brown | B26D 3/185 83/167 |
| 9,079,323 | B2 * | 7/2015 | Hauser | B26D 1/30 |
| 2004/0250667 | A1 * | 12/2004 | Atwater | B26D 3/185 83/13 |
| 2006/0093716 | A1 * | 5/2006 | Wu | B26D 1/553 426/518 |
| 2006/0272162 | A1 * | 12/2006 | Atwater | B26B 3/04 30/303 |
| 2009/0302042 | A1 * | 12/2009 | Henry | A21B 3/135 99/357 |
| 2010/0224041 | A1 * | 9/2010 | Melton | B26D 1/09 83/167 |
| 2010/0313769 | A1 * | 12/2010 | Henry | A21B 3/135 99/427 |
| 2015/0000141 | A1 * | 1/2015 | Owens | A21C 15/04 30/114 |
| 2016/0100589 | A1 * | 4/2016 | Boulrece | B26B 5/008 83/52 |
| 2018/0154536 | A1 * | 6/2018 | Repac | B26B 27/00 |
| 2018/0332862 | A1 * | 11/2018 | Horne | A21B 3/135 |
| 2021/0259259 | A1 * | 8/2021 | Axtell | A47J 47/08 |
| 2023/0013836 | A1 * | 1/2023 | Axtell | A21C 15/04 |

FOREIGN PATENT DOCUMENTS

| | | | | |
|---|---|---|---|---|
| FR | 2641945 | A1 * | 7/1990 | B26D 1/09 |
| FR | 2682273 | A3 * | 4/1993 | A47J 27/13 |
| FR | 2718611 | A1 * | 10/1995 | A21C 11/106 |
| FR | 2735061 | A1 * | 12/1996 | A21C 11/106 |
| FR | 2969903 | A1 * | 7/2012 | A21C 11/106 |
| FR | 2998449 | A1 * | 5/2014 | A21C 15/04 |
| IT | RM20130003 | A1 * | 4/2014 | |
| WO | WO-9302608 | A1 * | 2/1993 | A47J 27/002 |
| WO | WO-9307755 | A1 * | 4/1993 | A21B 3/13 |
| WO | WO-2014082235 | A1 * | 6/2014 | B26D 1/553 |
| WO | WO-2024216303 | A2 * | 10/2024 | A47J 37/01 |

* cited by examiner

FOOD CUTTING ASSEMBLY

RELATED APPLICATIONS

This is a CIP application that takes priority from non-provisional Application U.S. Ser. No. 17/187,665 filed Feb. 26, 2021 entitled Food Cutting Device, which takes priority from U.S. provisional Application No. 62/981,886 filed Feb. 26, 2020 entitled Food Cutting Device, all of which are hereby incorporated by reference as if fully set forth herein.

FIELD OF THE EMBODIMENTS

The field of the invention and its embodiments relate to food cutting devices and assemblies. In particular, the present invention and its embodiments provide a child-safe food cutting device and a food cutting assembly that easily cuts a cooked food product into easily handled, equally sized, and equally shaped portions.

BACKGROUND

Numerous household consumer items exist, which assist in the cutting of both cooked and uncooked food products. Examples of such household consumer items include salad slicers and apple wedgers, among others, which utilize highly sharpened cutting blades to cut or divide the food product into smaller-sized portions having a similar or identical shape and size. For example, an apple wedger may be used to cut fruits or vegetables into similar or identical shaped and sized wedges. The apple wedger may include a slicer portion and a handle. The slicer portion may have a peripheral frame structure and internal cutting blades. A user may engage with the handle to push food items through the gaps between cutting blades.

As another example, a salad slicer may include a salad bowl having an upper rim and a mandoline slicer. The mandoline slicer may fit on the upper rim of the salad bowl and may include a main platform along which food is to be slid by the user and a cutting tool disposed in the main platform, with a space adjacent the cutting edge of the tool. When food is slid across the main platform, the cutting edge removes a quantity of the food, which falls through the space and into the salad bowl.

Based on the configuration of the cutting blades employed in these food cutting devices, a great deal of force must be exerted by the user on the food cutting device to slice the food product. Further, these devices are dangerous and cannot be used by children, as the blades may severely injure the user if the device and/or the food product slips while the user is attempting to slice the food product. Moreover, the user may engage with the food cutting device numerous times to cut the food product into the desired shapes and sizes. As such, these food cutting devices make the cutting of food products quite time consuming.

Furthermore, as an alternative to these food cutting devices, a knife can be used. However, the same drawbacks associated with the blades of the food cutting devices are seen with use of a knife. Thus, a need exists for a child-safe food cutting device or food cutting assembly that quickly and easily cuts a food product into equally sized and shaped portions.

Review of Related Technology

U.S. Pat. No. 9,630,334 B2 describes a circular food cutting assembly. The food assembly includes an outer ring that has an inner surface, an outer surface, and a bottom edge comprising a blade. A pair of handles are attached to the outer surface. Cutting members are attached to and extend between the outer ring and an inner ring such that the inner ring is coaxial with the outer ring. Each of the cutting members has a lower edge comprising a blade. The lower edges of the cutting members and the bottom edge are co-planar. An intermediate ring has a first edge and a second edge positioned opposite each other, such that the second edge is directed downwardly and comprises a blade. The intermediate ring is removably attached to the cutting members, such that the second edge is co-planar with the lower edges.

U.S. Pat. No. 8,726,521 B2 describes an apple wedger for cutting fruits or vegetables into wedges. The apple wedger includes a slicer and a pusher/handle. The slicer has a peripheral frame and internal cutting blades. A user may engage with the pusher/handle to push food items through the gaps between cutting blades. In some versions, the pusher/handle is pivotally attached to the slicer.

U.S. Patent Application Publication No. 2018/0339417 A1 describes an assembly for slicing a food item. The assembly includes a plate selectively positioned on a support surface. A plurality of pegs are provided and each of the pegs is coupled to and extends upwardly from the plate. A food item is placed on each of the pegs. Moreover, the plurality of pegs space the food item from the plate thereby facilitating the food slicer to slice fully through the food item.

EP 2,087,969 B1 describes a food cutting device. The device includes a frame defining an aperture therein and cutting blades located within the frame across the aperture. The cutting blades are arranged in a lattice structure and have cutting edges facing in a common cutting direction. At least some of the cutting blades intercept with one another at certain intercepting positions and include portions between at least some of the intercepting positions having reduced blade-making material so as to reduce the area of contact of the cutting blades with food when the latter is being cut.

EP 2,090,410 A1 describes a food cutting device that includes a body frame defining an aperture therein and a cutter removably located within the aperture. The body frame has a first engaging formation (e.g., an L-shaped slot). The cutter has a second engaging formation (e.g., a protrusion) that is located adjacent and releasably engages with the slot for connecting the cutter to the body frame.

U.S. Pat. No. 7,086,155 B2 describes an apparatus for coring and slicing a food item. The apparatus includes a peripheral member, a coring element, and blades extending radially from the coring element to the peripheral member in spaced relation about the coring element. The apparatus may be combined with a base for securing the food item.

Various references describe attempts at remedying the difficulties associated with providing a child-safe solution to cutting a cooked food product without use of a knife. However, a need exists for a child-safe food cutting device or a food cutting assembly that easily cuts a cooked food product into equally sized and shaped portions.

SUMMARY

The present invention and its embodiments relate to food cutting devices and food cutting assemblies. In particular, the present invention and its embodiments provide a child-safe food cutting device and a food cutting assembly that easily cuts a cooked food product into equally sized and shaped portions.

A first embodiment of a food cutting assembly is illustrated in FIGS. 1-4. The assembly comprises a container for holding food, a cutting device for cutting the food in the container, and a cover that hinders the food from cooling. In examples, the container may be generally square or rectangular. The food cutting assembly may comprise one or more of: a plastic material, a metal material, a wood material, a composite material, a glass material, and/or a resin material. The food cutting device may include a support structure defining an aperture therein. The support assembly may comprise container, cutting device, and cover having a similarly configured shape that includes at least one straight line, and/or at least one arc, such as: a circular or oval shape, a crescent shape, and a semicircular shape. In other examples, the support structure may include a shape selected from the group consisting of: a triangular shape, a quadrilateral shape, a pentagonal shape, a hexagonal shape, a heptagonal shape, an octagonal shape, a nonagonal shape, a decagonal shape, a hendecagonal shape, a dodecagonal shape, a tridecagonal shape, a tetradecagonal shape, a pentadecagonal shape, a hexadecagonal shape, a heptadecagonal shape, an octadecagonal shape, an enneadecagonal shape, and an icosagonal shape. In some examples, a length of the support structure is in a range of approximately 6 inches to approximately 9 inches, and/or a width of the support structure is in a range of approximately 3 inches to approximately 6 inches.

The food cutting device may also include cutting members located within the support structure and arranged in a shape across the aperture to define sections between the cutting members. The cutting members may be vertically disposed. The cutting members may form a lattice shape. The lattice may be formed by a first portion of straight cutting members, disposed vertically in a common direction, intersecting a second portion of the straight cutting members, disposed vertically in direction orthogonal to the first portion. In other examples, all of the cutting members may be disposed vertically to face the same direction. According to some examples, each of the sections defined by the cutting members has an area of approximately 1 square inch.

The food cutting device may also include one or more handles affixed to the support structure. In some examples, the one or more handles include a first handle and a second handle. The first handle may be affixed to the support structure at a highest point of the support structure, and a second handle may be affixed to the support structure at a second location opposite the first location such that the first and second handles lie in the same horizontal plane. In examples, the first and second handles may extend vertically above a top edge the support structure. In other examples, the first and second handles may extend horizontally from a top edge of the support structure.

The food cutting assembly may further include a cover having a first side and a second side, configured to engage an opening of the container to form a closed container. The cover unit may also include a third handle affixed to the first side.

A second embodiment of a food cutting device is illustrated in FIGS. 5-8. The food cutting assembly may include a container configured to house a food product. The food product may be a cooked food product, such as a cooked pasta product. In some examples, a periphery of the container may be circular, preferably having a diameter within a range of approximately 8 inches to approximately 14 inches. In other examples, the periphery of the container may be an ellipse having a major axis within a range of approximately 11 inches to approximately 14 inches, and a minor axis within a range of approximately 8 inches to approximately 11 inches. In some examples, a depth of the container is within a range of approximately 2 inches to approximately 5 inches.

The food cutting assembly may also include a food cutting device configured to fit closely inside of the container for cutting a food product contained within the container. The food cutting device may include a frame or support structure having a closed, continuous periphery defining an aperture therein. The food cutting device may include cross-cutting members located within the aperture and arranged across the aperture in two orthogonal directions, to define sections between the cutting members. The cutting members may be vertically disposed. The cross-cutting members may form a lattice of sections. In some examples, some or all of the sections defined by the cross-cutting members may have an area of approximately 1 square inch.

The food cutting assembly may also include at least one handle affixed to the peripheral frame structure. In some examples, the handle has a first end affixed to the peripheral frame structure at a first location, and a second end affixed to the peripheral frame structure at a second location opposite the first location. The handle may be disposed horizontally.

The food cutting assembly may further include a cover unit comprising a first side disposed opposite a second side, where the second side is configured to engage an opening of the container to form a closed container. The cover unit may also include a third handle affixed to the first side.

A third embodiment of a food cutting assembly is illustrated in FIGS. 9-11. The assembly comprises a container for holding food, a cutting device for cutting the food in the container, and a cover that hinders the food from cooling. In examples, the container may be circular or oval, and if longer in a first direction than in a second direction, may be truncated at one or both ends of the longer dimension. The food cutting assembly may comprise one or more of: a plastic material, a metal material, a wood material, a composite material, a glass material, and/or a resin material. The support assembly may comprise container, cutting device, and cover of the support assembly may have similarly configured shapes that fit together loosely. The shapes may include at least one straight line, and/or at least one arc, such as: a circular or oval shape, a crescent shape, and a semicircular shape. In other examples, the support structure may include a shape selected from the group consisting of: a triangular shape, a quadrilateral shape, a pentagonal shape, a hexagonal shape, a heptagonal shape, an octagonal shape, a nonagonal shape, a decagonal shape, a hendecagonal shape, a dodecagonal shape, a tridecagonal shape, a tetradecagonal shape, a pentadecagonal shape, a hexadecagonal shape, a heptadecagonal shape, an octadecagonal shape, an enneadecagonal shape, and an icosagonal shape. In examples, a major axis of the food cutting assembly is in a range of approximately 6 inches to approximately 9 inches, and/or a minor axis in a range of approximately 3 inches to approximately 6 inches.

The food cutting device may include a support structure defining an aperture therein. It may also include cutting members located within the support structure and arranged in a shape across the aperture to define sections between the cutting members. The cutting members may be vertically disposed. The cutting members may form a lattice shape. The lattice may be formed by a first portion of straight cutting members, disposed vertically in a common direction, intersecting a second portion of the straight cutting members, disposed vertically in direction orthogonal to the first portion. In other examples, all of the cutting members may be disposed vertically to face the same direction. According to some examples, each of the sections defined by the cutting members has an area of approximately 1 square inch.

The food cutting device may also have one or more handles affixed to the support structure. In some examples, the one or more handles include a first handle and a second handle. The first handle may be affixed to the support structure at a highest point of the support structure, and a second handle may be affixed to the support structure at a second location opposite the first location such that the first and second handles lie in the same horizontal plane. In examples, the first and second handles may extend vertically above a top edge the support structure. In other examples, the first and second handles may extend horizontally from a top edge of the support structure.

The container may also have handles at opposite sides. The handles may extend from the container, or be affixed to sides of the container, or may be formed as part of the container, disposed proximate a highest point of the container.

The food cutting assembly may further include a cover having a first side and a second side, configured to engage an opening of the container to form a closed container. The cover may also include a handle affixed to or formed as part of the first side. In examples, the cover may further include holes for ventilation to prevent air pressure within the covered container from being substantially different from the ambient air pressure. The cover may also include notches or indentations at the locations of handles in the food cutter and/or the container that extend away from their respective peripheries.

A method to cut a food product using a food cutting assembly 300 is also described. The food cutting assembly 300 may include a food cutting device 100 having a peripheral frame structure 2 defining an aperture therein, and cutting members 10, 12 located within the peripheral frame structure 2 and arranged in a lattice configuration across the aperture to define sections 8 between the cutting members 10, 12. The cutting members 10, 12 may be located co-planar with sides of the peripheral frame structure 2.

The food cutting device may also include one or more handles affixed to the peripheral frame structure. In some examples, the one or more handles include a first handle and a second handle affixed to the peripheral frame structure at opposite locations. The first and second handles may be located in a plane disposed above the top of the peripheral frame structure. In other examples, the one or more handles may include a single handle that extends horizontally in above the peripheral frame structure, coupled between two vertical struts attached to opposite sides of the peripheral frame structure.

The method includes several process steps, that may include, for example: placing, by a user, a food product, such as a cooked food product, onto a plate; and engaging, by the user, the first handle and the second handle to push the food cutting device into the food product such that the cutting members cut the food product into pieces. The pieces may have an area of approximately 1 inch to approximately 2 inches.

In general, the present invention succeeds in conferring the following benefits and objectives.

It is an object of the present invention to provide a food cutting device and/or food cutting assembly that allows a user to quickly cut a cooked food product into even and equally sized portions.

It is an object of the present invention to provide a food cutting device and/or food cutting assembly that allows a user to conveniently cut a cooked food product into easy to handle, even, and equally sized portions.

It is an object of the present invention to provide a safe and child-proof food cutting device and/or food cutting assembly that allows a child to quickly and conveniently cut a cooked food product into even and equally sized portions, without the need for adult supervision. Examples of a food cutter for use by a child may have cutting blades made of a flexible plastic or the like, having an edge firm enough to cut through pasta, but not firm enough to cut through the child's flesh.

DETAILED DESCRIPTION

Figure 1:
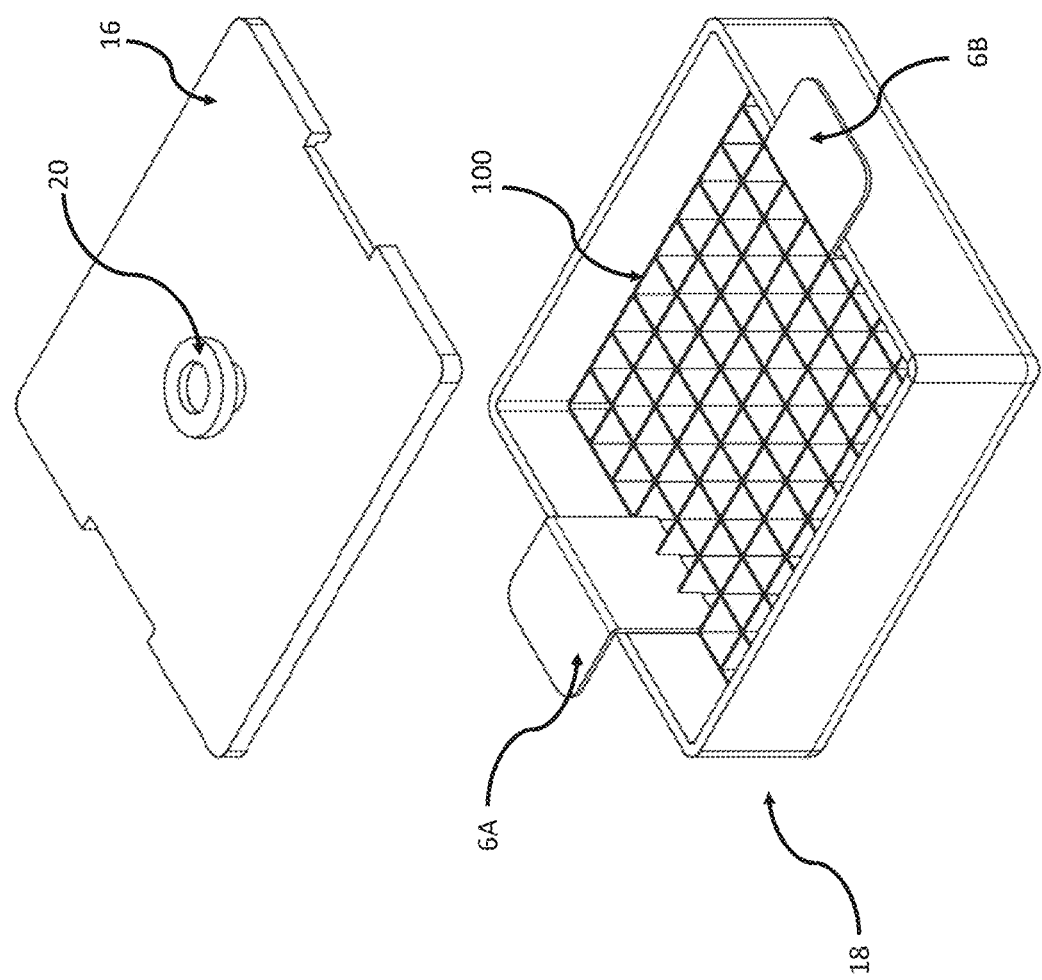
FIG. 1 is a first perspective view of a first configuration of a first embodiment of a food cutting assembly described in the disclosure.

Embodiments of the present invention will now be described with reference to the drawings, in which identical elements are identified with the same reference numerals.

Reference will now be made in detail to example embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
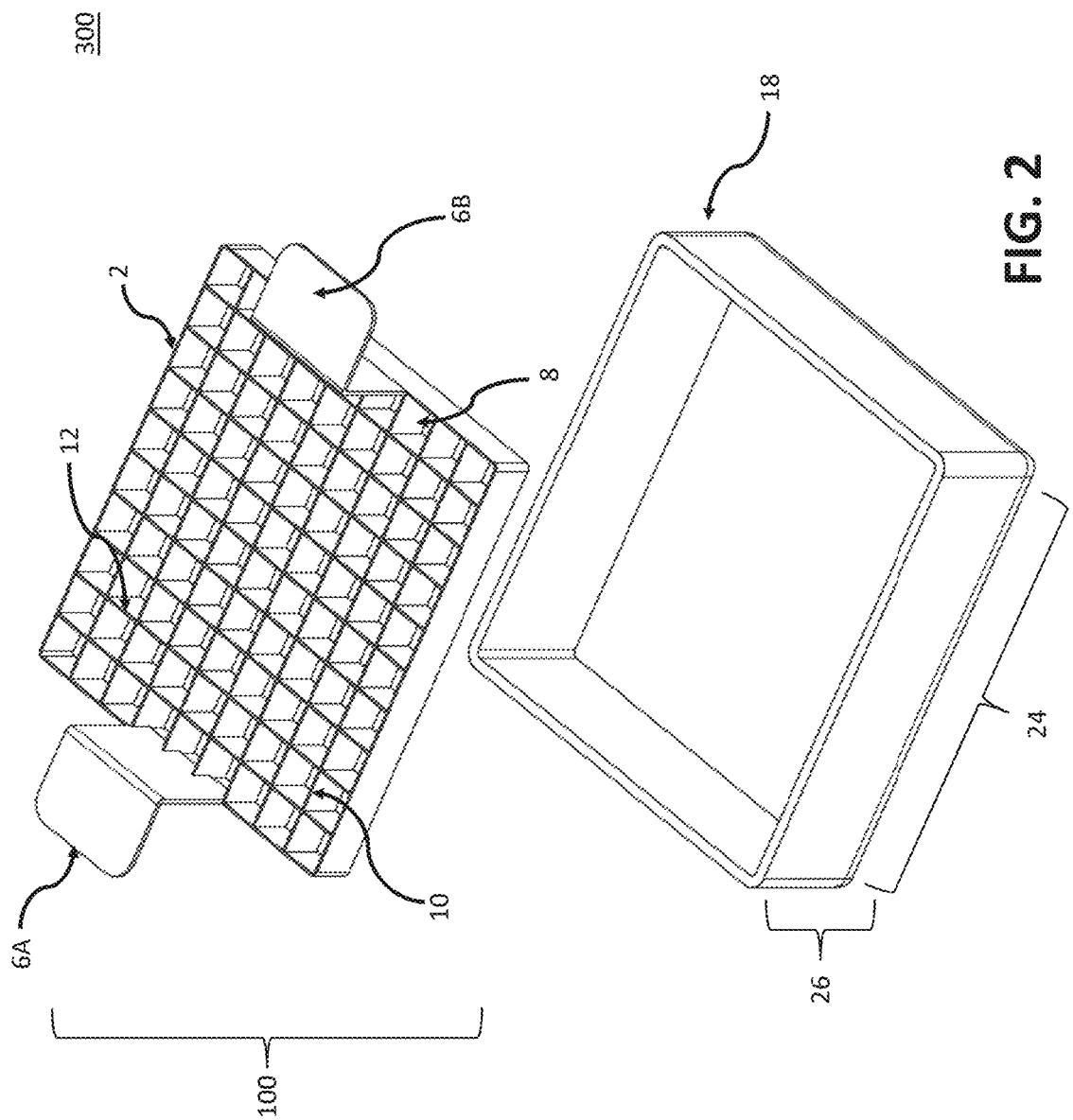
FIG. 2 is a perspective view of a second configuration of the first embodiment of the food cutting assembly.
Figure 3:
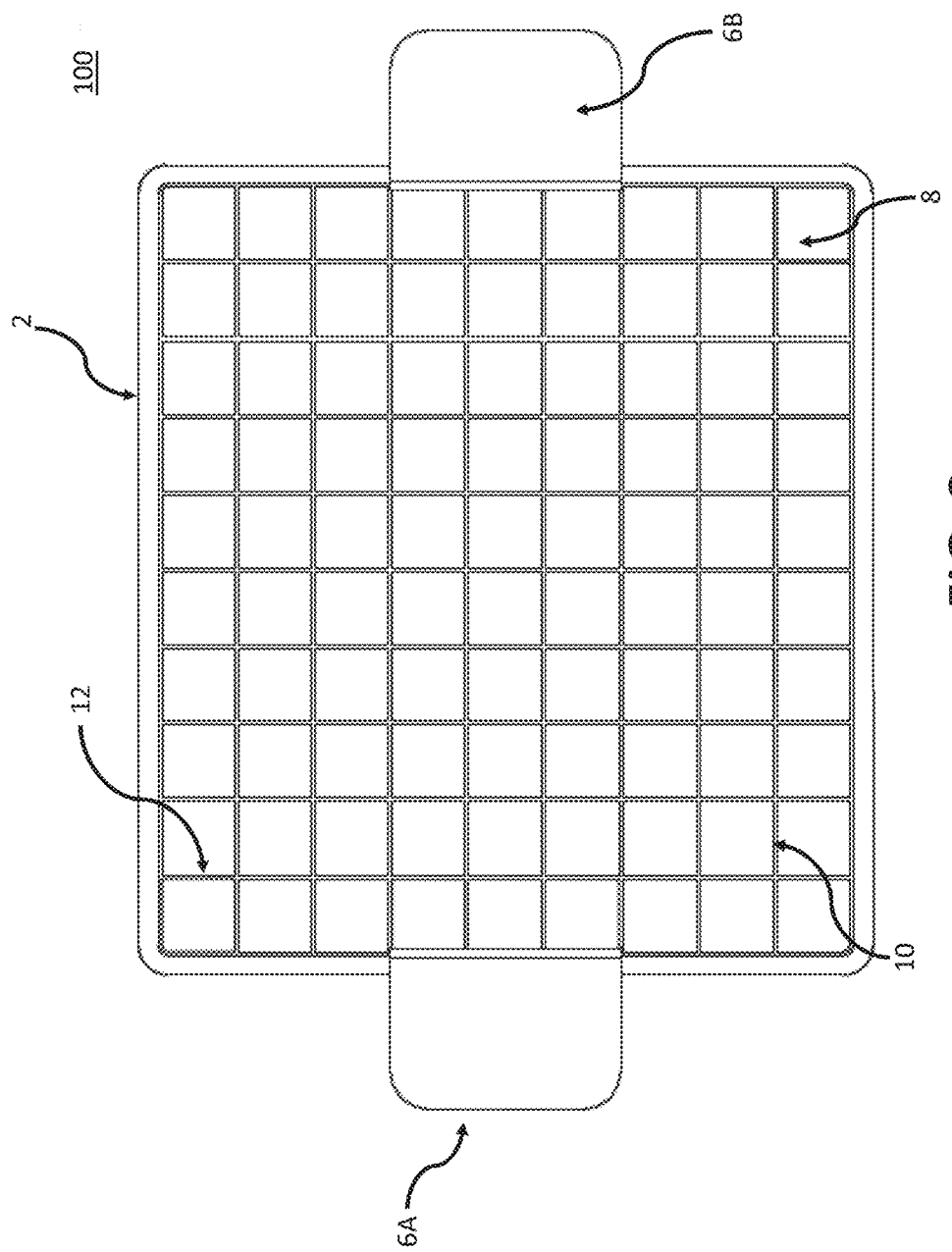
FIG. 3 is a top view of the second configuration of the first embodiment of the food cutting assembly.
Figure 4:
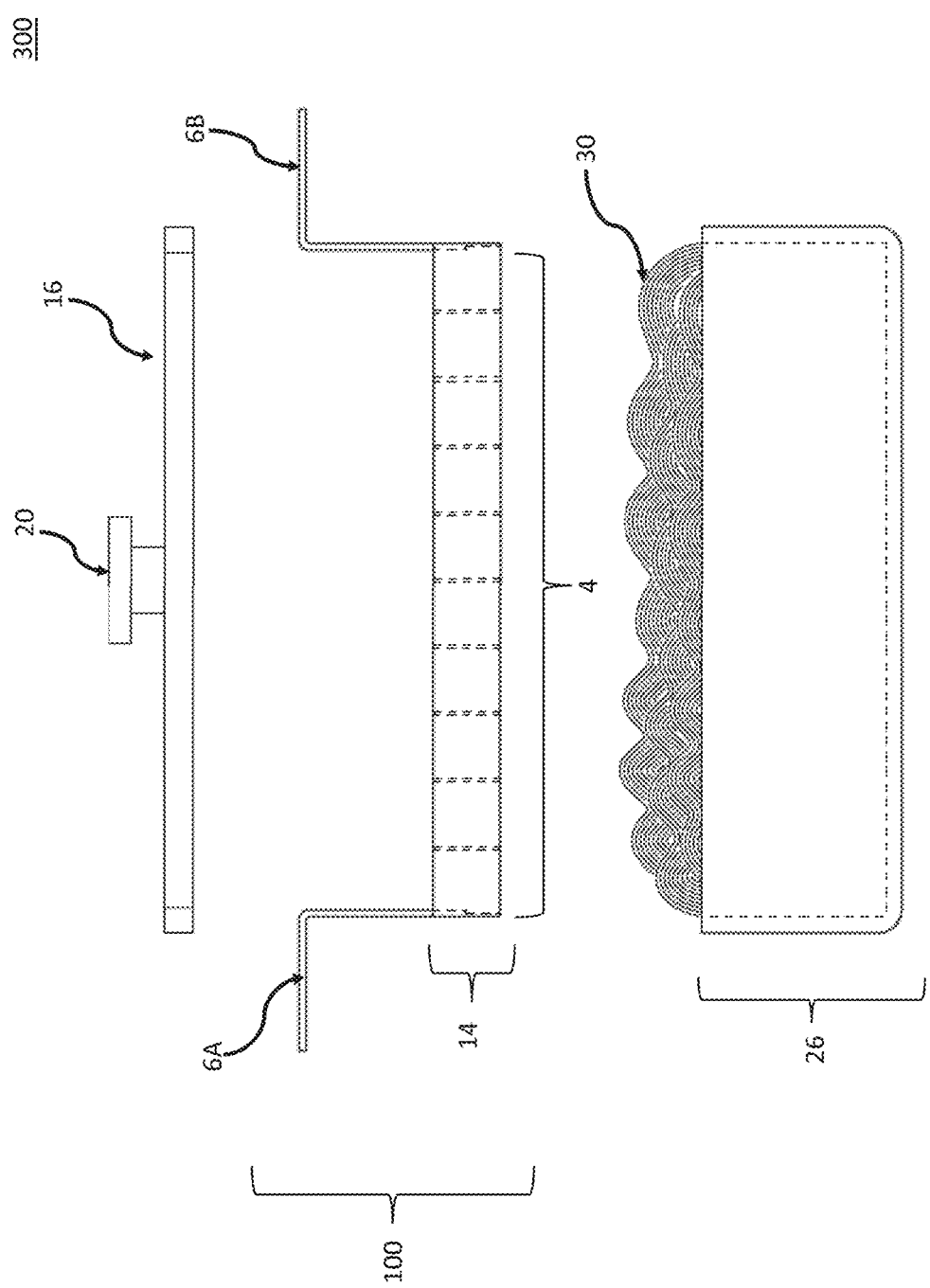
FIG. 4 is a side view of parts of the first embodiment of the food cutting assembly.

A first embodiment of a food cutting assembly 300 is depicted in FIGS. 1-4. In some examples, food cutting device 100 is configured to cut a food product 30 (as depicted in FIG. 4) into pieces or portions of approximately equal size. The food product 30 may be a cooked or an uncooked food product. In preferred examples, the food product 30 is a cooked pasta food product. It should be appreciated that other food products are contemplated by the embodiments described herein and the food product 30 is not limited to the products explicitly described.

The food cutting assembly 300 may comprise one or more of a plastic material, a metal material, a wood material, a composite material, a glass material, and/or a resin material. The food cutting device 100 may comprise a peripheral frame structure 2 defining an aperture therein. In some examples, the peripheral frame structure 2 may have a shape that includes at least one arc and/or at least one straight line. For example, the peripheral frame structure 2 may have a circular shape, an oval shape, a crescent shape, a semicircular shape, or the like. In other examples, the shape of the peripheral frame structure 2 may be or include a polygon, for example, a shape selected from the group consisting of: a triangular shape, a quadrilateral shape, a pentagonal shape, a hexagonal shape, a heptagonal shape, an octagonal shape, a nonagonal shape, a decagonal shape, a hendecagonal shape, a dodecagonal shape, a tridecagonal shape, a tetradecagonal shape, a pentadecagonal shape, a hexadecagonal shape, a heptadecagonal shape, an octadecagonal shape, an enneadecagonal shape, and an icosagonal shape. It should be appreciated that the shape of the peripheral frame structure 2 is not limited to the shapes explicitly described herein and other shapes are contemplated. In examples, length 4 (as depicted in FIG. 4) of the peripheral frame structure 2 may be in a range of approximately 6 inches to approximately 9 inches. A width of the peripheral frame structure 2 may be in a range of approximately 3 inches to approximately 6 inches. These dimensions are examples only; other dimensions may be used.

The food cutting device 100 also includes cutting members 10, 12, located within the peripheral frame structure 2. The cutting members may be arranged vertically, and may be disposed in orthogonal directions across the aperture to define sections 8 between the cutting members, 10, 12 (as depicted in FIGS. 2 and 3). The cutting members 10, 12 may comprise one or more of a plastic material, a metal material, a wood material, a composite material, a glass material, and/or a resin material. In some examples, the cutting members 10, 12 are arranged in a lattice shape formed by a first portion of the cutting members intersecting with a second portion of the cutting members. The cutting members 10, 12 may be located co-planar with the peripheral frame structure 2 in a first plane and in a second plane orthogonal to the first plane, respectively. In examples, each of the cutting members 10, 12 may comprise a blade 14 (shown in FIG. 4). The blades 14 may face different directions, for example, orthogonal directions, or they be arranged in a same, common direction. The blades 14 may comprise a child-safe material, such as a flexible plastic material, having a cutting edge sharp enough to cut pasta or other easily cut food, but not sharp enough to cut flesh, such as a child's finger. As such, the user who engages with the food cutting device 100 may be either a child or an adult. In examples, each of the sections 8 between the cutting members 10, 12 has an area of approximately 1 inch.

The first embodiment of the food cutting device 100 may also include a first handle 6A extending from the peripheral frame structure 2 at a first location, and a second handle 6B extending from the peripheral frame structure 2 at a second location opposite the first location (as depicted in FIGS. 1-4). The first and second handles 6A and 6B respectively may be located in a plane above the top edge of the peripheral frame structure 2 to provide leverage for a user to push the food cutting device 100 into the food product 30 to cut the food product 30 into pieces of approximately equal size.

It should be appreciated that the material(s) comprising the food cutting device 100, the cutting members 10, 12, and the blade 14 are not limited to the materials explicitly described herein, and other appropriate materials may be used.

A second embodiment of the food cutting assembly 300 is depicted in FIGS. 5-8. It should be appreciated that the second embodiment of the food cutting device 100 is similar to the first embodiment of the food cutting device 100. As disclosed previously, the food cutting device 100 comprises a peripheral frame structure 2 defining an aperture therein. The food cutting device 100 also includes cutting members 10, 12 located within the peripheral frame structure 2, and may be arranged in a lattice configuration across the aperture defining sections 8 as the spaces between the cutting members 10, 12. In embodiments, the peripheral frame structure 2 is in the shape of a quadrilateral with straight sides, such as a square or rectangle. The cutting members 10, 12 may be arranged co-planar with the sides of the peripheral frame structure 2 in a first plane and a second plane perpendicular to the first plane, for example, a first plane parallel to the front/back sides, and a second plane parallel the left/right sides.

Figure 5:
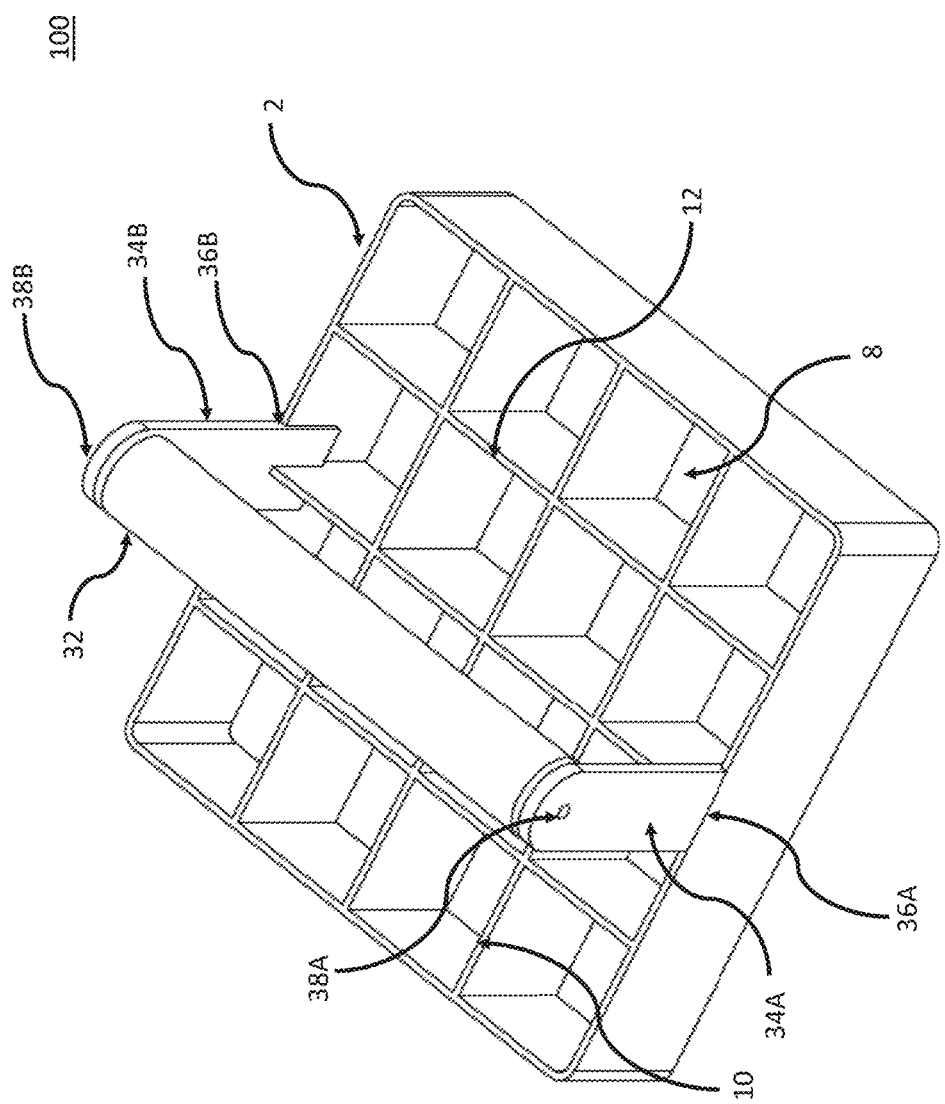
FIG. 5 is a perspective view of a second embodiment of a food cutting assembly described in the disclosure.
Figure 6:
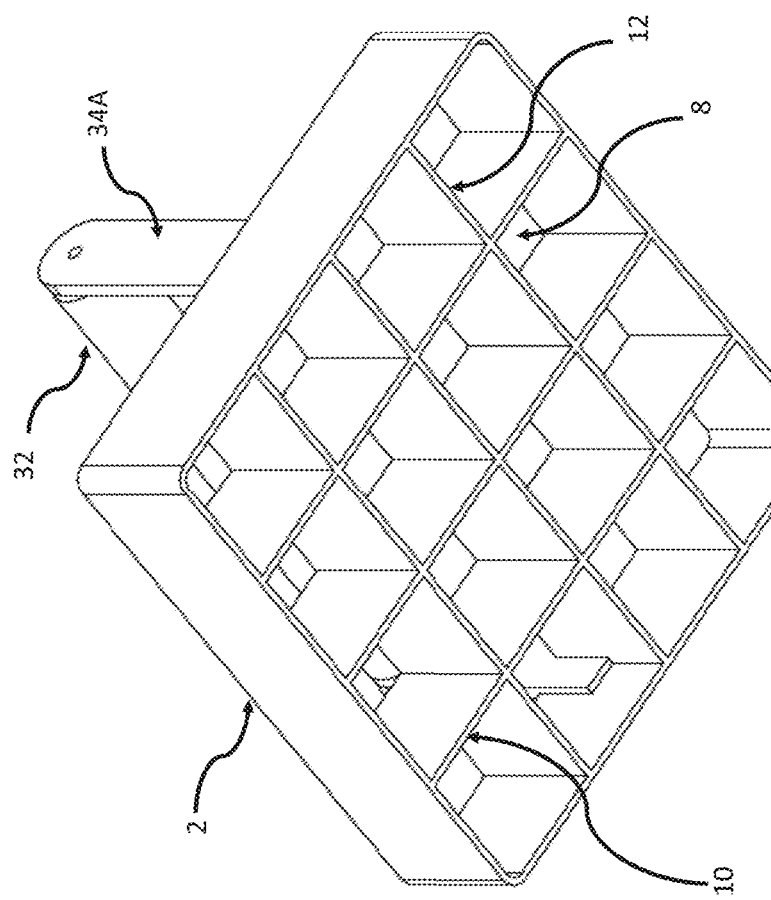
FIG. 6 is a bottom perspective view of the second embodiment of the food cutting assembly.
Figure 7:
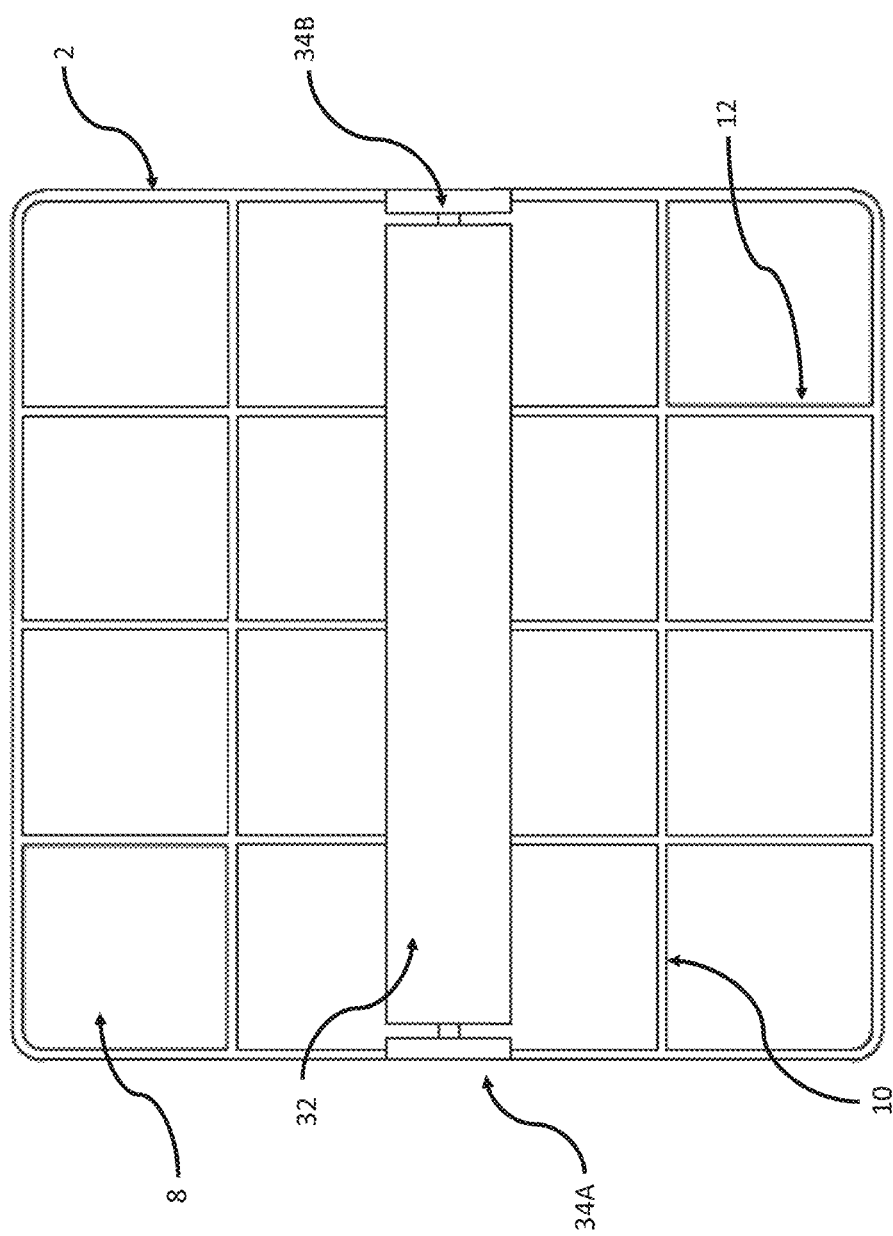
FIG. 7 is a top view of the second embodiment of the food cutting assembly.
Figure 8:
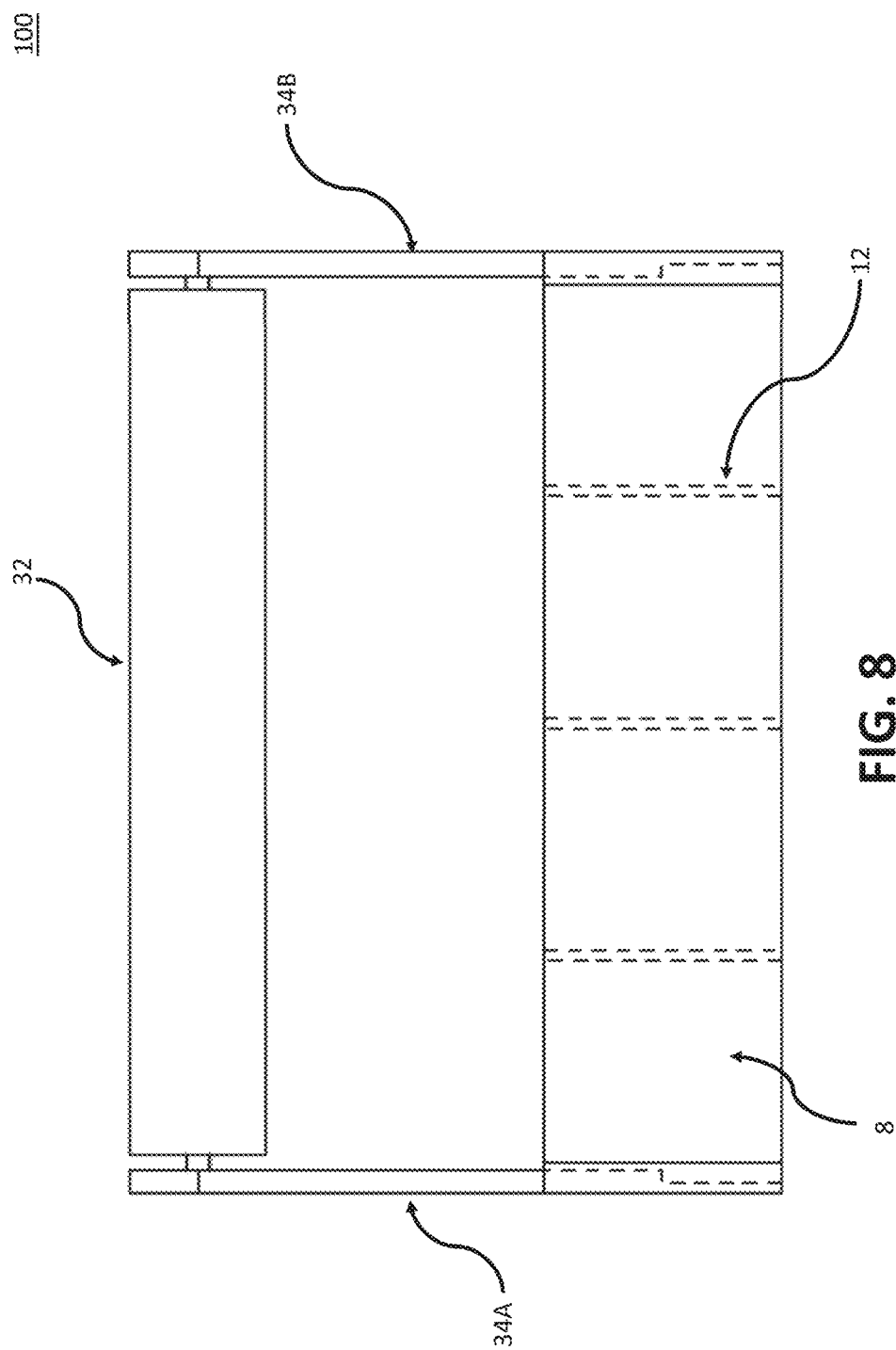
FIG. 8 is a side view of the second embodiment of the food cutting assembly.

As shown in FIGS. 5, a second embodiment of the food cutting device 100 may include a first component 34A extending vertically from a side of the peripheral frame structure 2 at a first location 36A, and a second component 34B extending vertically from an opposite side of the peripheral frame structure at a second location 36B. Furthermore, the second embodiment of the food cutting device 100 also includes a handle 32 disposed horizontally between the first and second components 34A and 34B, respectively. For example, the handle 32 may be coupled at one end proximate the top of the first component 34A at location 38A, and the other end may be coupled proximate the top of the second component 34B, at location 38B. The handle 32 may have a substantially circular cross section, but it is contemplated other cross sectional shapes may be used.

Figure 11:
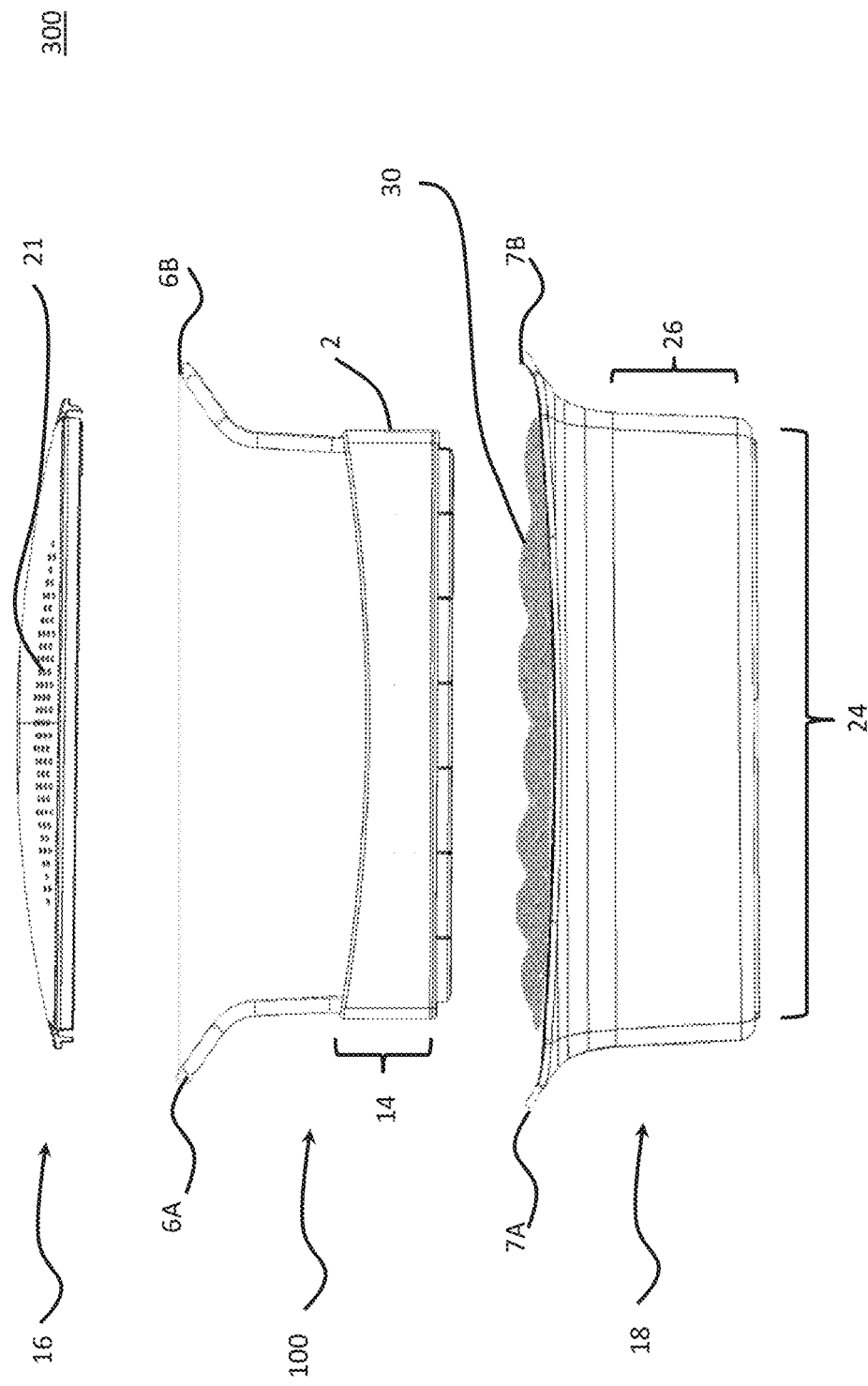
FIG. 11 is a side view of the disassembled parts of the third embodiment of the food cutting device.

In an exemplary scenario, the user may place the food product 30, such as a cooked pasta product (as depicted in FIG. 11) on a plate (not shown), preferably placed on a horizontal surface. If the food cutting device 100 is of the first embodiment, the user may place their hands on the first handle 6A and the second handle 6B, respectively. Alternatively, if the food cutting device 100 is of the second embodiment, the user may place their hands on the handle 32. The user may then push the food cutting device 100 down into the food product 30 such that the cutting members 10, 12 cut the food product 30 into pieces. The size of the pieces of the food product 30 is defined by the size of the sections 8 between the cutting members 10, 12.

In an example where each section of the sections 8 between the cutting members 10, 12 has an area of approximately 1 inch, the pieces of the food product 30 may be approximately 1 square inch in area. In another example where each section of the sections 8 between the cutting members 10, 12 has an area of approximately 2 inches, the pieces of the food product 30 may be approximately 4 square inches in area (2 inches by 2 inches).

In example embodiments, the cutting members 10, 12 may be disposed in orthogonal directions within the peripheral frame structure 2, and may be arranged in a lattice configuration across the aperture to define sections 8 between the cutting members 10, 12, such that each of the sections 8 is in the shape of a quadrilateral, such as a square or rectangle. In this example, if the food product consists of flat thin sheets such as lasagna noodles, the shape of the pieces of the food product 30 will be defined by the shapes of the sections 8. In another example, the cutting members 10, 12 located within the peripheral frame structure 2 may be arranged in a configuration across the aperture to define sections 8 between the cutting members 10, 12 such that each of the sections 8 is triangular in shape. In this example, the shape of each of the pieces of the food product 30 is also triangular, and of a size similar to a corresponding section 8. In a further example, the cutting members 10, 12 located within the peripheral frame structure 2 may be arranged in a configuration across the aperture to define sections 8 between the cutting members 10, 12 such that each of the sections 8 is circular in shape. In this example, the shape of the pieces of the food product 30 are circular. It should be appreciated that the size and shape of each of the sections 8, as well as the size and shape of the pieces of the food product 30, is not limited to the examples explicitly described herein. In embodiments, the sections may define a regular or irregular tessellation of any desired configuration.

Figure 9:
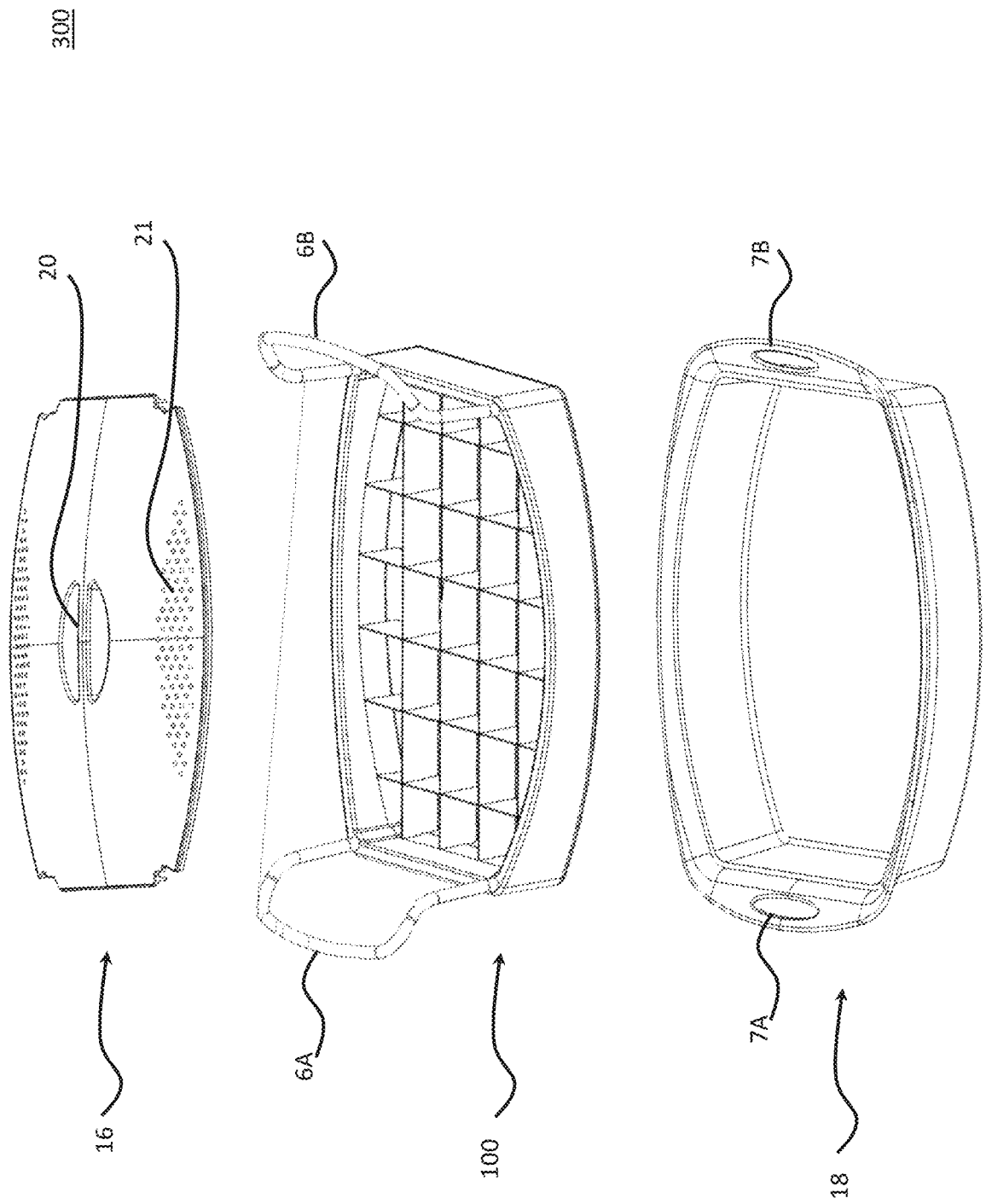
FIG. 9 is a perspective view of disassembled parts of a third embodiment of a food cutting assembly described in the disclosure.
Figure 10:
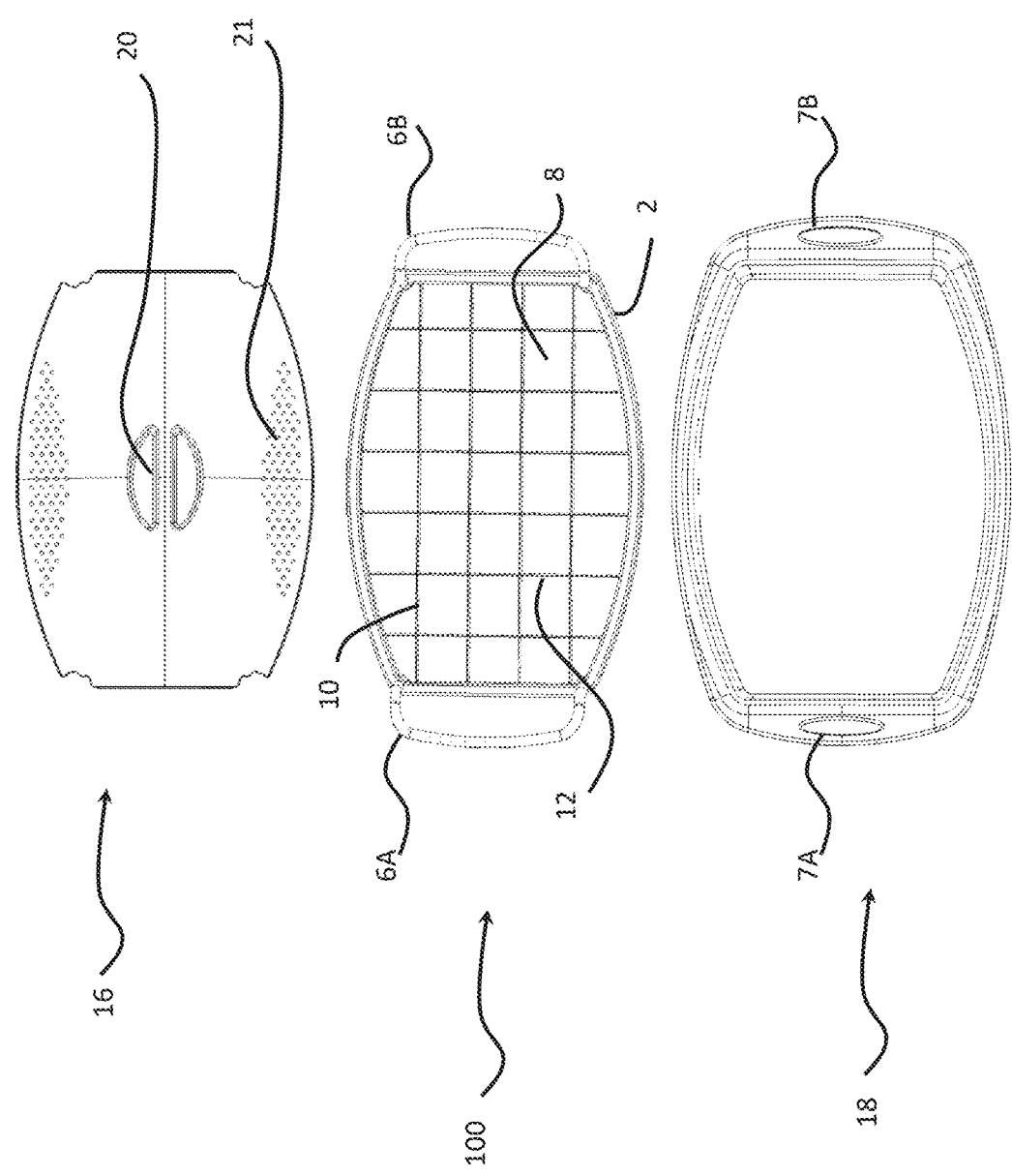
FIG. 10 is a top view of the disassembled parts of the third embodiment of the food cutting assembly.

A third embodiment of a food cutting assembly 300 is depicted in FIGS. 9-11. This embodiment can be used to cook food in a microwave oven, and to cut and serve the cooked food using a single container, such as a dish or container. Accordingly, the container 18 and lid 16 are made of a microwave safe material, such as plastic, glass, ceramic, pyroceram, or the like. In example embodiments, the container and lid may be heat resistant and oven safe, and as such are made of a heat resistant material such as glass, ceramic, or pyroceram or the like. The food cutter device 100 would not be used during cooking, and as such need not be made of a microwave- or conventional oven-safe material. After use, all of the parts of the food cutter assembly 300 may be washed by hand or in a dishwasher. As such, the parts are preferably made of a dishwasher safe material such as plastic, glass, ceramic, pyroceram, or the like.

In an example embodiment, the shape of the container 18 may be configured to accommodate uncooked dry spaghetti, having a bottom at least 10" wide. The container 18 with lid 16 may further configured to fit into most medium sized microwave ovens, and as such is no more than 13" wide including the lid. The container 18 has handles 7A, 7B, which may be disposed proximate the top edge of the container as shown in FIG. 9, or may extend horizontally from the ends at the top edge of the container (not shown). The lid 16 has a handle 20, which may be molded into the lid or may extend upward from the top center of the lid 16. The lid 16 may also have holes 21 proximate the sides, and/or slits disposed in the center of the edges (not shown) for straining water after cooking.

In an example use case, dry spaghetti is placed in the container 18. The container 18 is filled with water over the top of the spaghetti, the lid 16 is placed on the container, and the container 18 is placed in the microwave oven to cook with the lid 16 covering the food in the container 18 to prevent splattering. When cooking is complete, the container 18 is removed from the microwave oven, and the cooked spaghetti may be drained through holes 21 in the lid 16 by holding the lid 16 in place with the thumbs as the container 18 is held sideways over a sink. Alternatively or in addition, a locking mechanism of any suitable type may be included in the container 18 and/or lid 16 to hold them together while draining. After draining, the lid 16 is removed, and the cutting device 100 is inserted into the container 18, and a downward force is applied to the food cutting device 100 to cut the spaghetti. Finally, tomato sauce, cheese, meatballs, etc., are added to the container 18 and tossed. The container 18 can then be used as a serving dish to serve the cooked food.

In some examples, food cutting device 100 is configured to cut a food product 30 (as depicted in FIG. 11) into pieces or portions of approximately equal size. Alternatively, the cutting members 10, 12 may be placed within the frame structure 2 with varying spacing between them to provide portions of different sizes. The food product 30 may be a cooked or an uncooked food product. As depicted in FIG. 11, the food product 30 may a cooked pasta food product. It should be appreciated that other food products are contemplated by the embodiments described herein and the food product 30 is not limited to the products explicitly described.

In general, it should be appreciated that the size and shape of the peripheral frame structure 2 is not limited to the sizes and shapes explicitly described herein, and other sizes and shapes are contemplated. In examples, length 4 (as depicted in FIG. 4) of the peripheral frame structure 2 may be in a range of approximately 6 inches to approximately 9 inches. A width of the peripheral frame structure 2 may be in a range of approximately 3 inches to approximately 6 inches. These dimensions are examples only; other dimensions may be used.

In general as shown in the various figures, the food cutting assembly 300 may include a container 18 such as a container, a cover unit 16 such as a lid, and the food cutting device 100 comprises a plurality of cutting members 10, 12 having blades 14. The lid 16 is sized and configured to fit closely on the container 18 so that the lid 16 covers the container 18. The food cutting device 100 is sized and configured to fit closely within the container 18, such that the food cutting device may be inserted into and fit closely within the container 18. The container 18 may further be configured to contain a food product 30, such as a cooked pasta product as depicted in FIGS. 4 and 11.

As depicted in FIG. 2, a longest dimension 24 of the container 18 is within a range of approximately 11 inches to approximately 14 inches. In other examples, a longest dimension 24 of the container 18 is within a range of approximately 8 inches to approximately 11 inches. In further examples, a depth 26 of the container 18 is within a range of approximately 2 inches to approximately 5 inches.

In examples, the user may place the container 18 on a horizontal surface. The user may then place a food product 30 into the container 18. Assuming that the food cutting device 100 is of the first embodiment, the user may place his/her hands on the first handle 6A and the second handle 6B, respectively. Or, if the food cutting device 100 is of the second embodiment, the user may place one or both of his/her hands on the handle 32. The user may then push the food cutting device 100 into the food product 30 such that the cutting members 10, 12 cut the food product 30 into pieces. The size and shape of the cut pieces of the food product 30 are defined by the size and shape of the sections 8 between the cutting members 10, 12.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A food cutting assembly comprising:
   a container having a bottom, a continuous wall coupled at its bottom edge to the container bottom, and a continuous top edge, the bottom and the continuous wall defining a volume, wherein the container is configured to receive a food product within the volume;
a food cutting device configured to cut the food product as downward pressure is applied to the food cutting device, the food cutting device comprising:
 a peripheral frame structure defining an aperture therein;
 a plurality of cutting members located within the peripheral frame structure and arranged within the aperture to define sections between the cutting members,
  wherein the plurality of cutting members are configured to cut the food product and extend below a top of the container when cutting the food product; and
 a first handle and a second handle extending upwardly from a top of the peripheral frame structure; and
a lid configured to closely engage the top edge of the container, the lid comprising:
 at least one handle located in a center of the lid;
 a first group of a plurality of apertures traversing a thickness of the lid and a second group of a plurality of apertures traversing the thickness of the lid;
 at least one opening proximate at least one edge of the lid; and
 indentations in the edge for receiving the first handle and the second handle extending vertically from the peripheral frame structure of the food cutting device.

2. The food cutting assembly of claim 1:
wherein the peripheral frame structure has four walls coupled at 90° to each other at respective first and second ends of each wall, to form in the peripheral frame structure first and second ends opposite each other, and two sides opposite each other;
wherein the first handle is attached to the first end of the peripheral frame structure via respective top ends of a first strut and a second strut, and the second handle is attached to a second end of the container via respective top ends of a third strut and a fourth strut;
wherein the first and second struts are coupled to first and second corners, respectively, at the first end of the peripheral frame structure, and the third and fourth struts are coupled to third and fourth corners, respectively, at the second end of the support structure;
whereby the first and second handles are affixed to the peripheral frame structure via their respective struts at respective corners at opposite ends of the frame structure, and
wherein the first and second handles are located in a horizontal plane above the top edges of the walls.

3. The food cutting assembly of claim 1, wherein a length of the container is within a range of approximately 11 inches to approximately 14 inches.

4. The food cutting assembly of claim 1, wherein a width of the container is within a range of approximately 8 inches to approximately 11 inches.

5. The food cutting assembly of claim 1, wherein a height of the container is within a range of approximately 2 inches to approximately 5 inches.

6. The food cutting assembly of claim 1, wherein the at least one handle of the lid extends vertically from the center of a top surface of the lid.

7. The food cutting assembly of claim 1, wherein the at least one handle of the lid is defined by a space extending between first and second openings in the lid proximate the lid's center.

8. The food cutting assembly of claim 1, wherein the at least one opening proximate at least one edge of the lid includes a plurality of openings proximate each of two side edges of the lid.

9. The food cutting assembly of claim 1, wherein the container comprises a first end and a second end disposed opposite the first end, and a first side and a second side disposed opposite the first side; and
wherein a top portion of the container's continuous wall diverges from vertical in a direction away from the volume of the container by at least one angle.

10. The food cutting assembly of claim 1, further comprising:
a handle at each end of the container defined by a hole formed in respective ends of the container proximate a top edge of the respective ends.

11. The food cutting assembly of claim 1, wherein the indentations in the edge of the lid include an indentation in each of four corners of the lid, each indentation arranged and configured to receive one of the first strut, the second strut, the third strut, or the fourth strut extending vertically from a corresponding corner of the food cutter device's peripheral frame structure.

12. The food cutting assembly of claim 1, wherein the plurality of cutting members are arranged in a lattice configuration.

13. A method to prepare food for eating, comprising:
placing dried spaghetti into a container of the food cutting assembly of claim 1;
filling the container to depth that covers the dried spaghetti;
putting on the container a lid configured to fit loosely on the container;
placing the covered container in a microwave oven and cooking the spaghetti therein;
removing the covered container from the microwave oven when the cooking is completed;
holding the lid onto the container as the container is tipped sideways and held over a sink to drain the water from the spaghetti;
placing into the container a food cutter configured to fit loosely into the container and comprising a plurality of cutting members, each cutting member having a respective edge;
applying a downward pressure to handles extending from a top of the food cutter to cut the spaghetti;
adding ingredients to the spaghetti, the ingredients comprising at least one of a gravy, a tomato sauce, a seasoning, grated cheese, and one or more meatballs to the spaghetti in the container;
tossing the spaghetti and the added ingredients together in the container; and
serving the tossed spaghetti in the container, used as a serving dish.

14. The method of claim 13, wherein the pieces of cut spaghetti have a length within a range of approximately 1 inch to approximately 2 inches.

15. The food cutting assembly of claim 1 wherein the first group of the plurality of apertures are disposed on an opposing side of the lid from the second group of the plurality of apertures.

16. The food cutting assembly of claim 1 wherein the first handle is located at a first end of the food cutting device and the second handle is located at a second end of the food cutting device, wherein the first end is located at an opposite end of the food cutting device from the second end.

17. A food cutting assembly comprising:
a container having a bottom, a continuous wall coupled at its bottom edge to the container bottom, and a continuous top edge, the bottom and the continuous wall defining a volume, wherein the container is configured to receive a food product within the volume;
a food cutting device configured to cut the food product as downward pressure is applied to the food cutting device, the food cutting device comprising:
  a peripheral frame structure defining an aperture therein;
  a plurality of cutting members located within the peripheral frame structure and arranged within the aperture to define sections between the cutting members; and
  a first handle and a second handle; and
a lid configured to closely engage the top edge of the container, the lid comprising:
  at least one handle located in a center of the lid;
  a first group of a plurality of apertures traversing a thickness of the lid and a second group of a plurality of apertures traversing the thickness of the lid;
  at least one opening proximate at least one edge of the lid; and
  indentations in the edge for receiving the first handle and the second handle extending vertically from the peripheral frame structure of the food cutting device;
wherein the peripheral frame structure has four walls coupled at 90° to each other at respective first and second ends of each wall, to form in the peripheral frame structure first and second ends opposite each other, and two sides opposite each other;
wherein the first handle is attached to the first end of the peripheral frame structure via respective top ends of a first strut and a second strut, and the second handle is attached to a second end of the container via respective top ends of a third strut and a fourth strut;
wherein the first and second struts are coupled to first and second corners, respectively, at the first end of the peripheral frame structure, and the third and fourth struts are coupled to third and fourth corners, respectively, at the second end of the support structure;
whereby the first and second handles are affixed to the peripheral frame structure via their respective struts at respective corners at opposite ends of the frame structure; and
wherein the first and second handles are located in a horizontal plane above the top edges of the walls.

* * * * *